Patented Nov. 16, 1943

2,334,171

UNITED STATES PATENT OFFICE 2,334,171

METHOD OF MAKING LIQUID COFFEE EXTRACTS

Clinton W. Carter, Allison Park, Pa.

No Drawing. Application November 26, 1941, Serial No. 420,491

6 Claims. (Cl. 99—71)

This invention relates to a new and useful method of forming liquid extracts from ground coffee or other soluble products, and it is among the objects thereof to provide a method whereby the extract can be economically produced to a high degree of concentration by a single extracting step.

There are various ways in which to produce liquid coffee extracts, the most common of which is to employ hot water, which filters through the ground coffee to form a rather weak extract that requires additional processing to obtain the desired degree of concentration.

Still another method consists in utilizing cold or warm water which is initially allowed to stand in the ground coffee to absorb the desirable aromatic and bitter properties of the ground coffee. The solution is then withdrawn and used for moistening a fresh batch of coffee and this procedure is repeated until the desired degree of concentration has been reached.

In accordance with the present method, a highly concentrated liquid extract is obtainable from freshly ground coffee by passing water through the freshly ground coffee in a manner to cause uniform distribution of the liquid throughout the coffee mass, thereby hastening the process and obtaining the maximum degree of concentration.

It is generally known in filter practice that liquid passing through a sand or gravel bed will follow a direct path to the point of effluent. If, therefore, a container is filled with finely ground coffee, and water heated to a high enough degree of temperature to effect quick and complete extraction is added at the surface, the flow of liquid therethrough will cause the mass to expand and pack, and the liquid will flow in substantially a straight line from the source to the flow cock. Under such conditions, the water probably will not flow through at all due to the expansion of the gases naturally present in roasted coffee, causing the mass to tighten against the walls of the container and making it impossible for the liquid to penetrate the mass.

I have discovered that by using an inert filtering substance such as paper pulp mixed-in with the ground coffee, the water passing through the coffee mass will be uniformly distributed throughout the mass, with the result that a much higher degree of concentration will result for a given volume of flow. Such a paper pulp or other inert filter mass may be evenly distributed throughout the finely ground coffee by shredding the paper pulp fibers and mixing it with the dampened coffee.

The use of the filter mass aids filtration of the liquid through the ground coffee, which because of the expansion when the water comes in contact with the coffee, would otherwise stall the process. The amount of filter mass used, as set forth hereinafter, is sufficient to take up the expansion and leave the mass loose enough for the proper continuation of the process.

The following is a typical example of the method I employ in making a highly concentrated liquid extract. The procedure is based on a 100-lb. batch of roasted coffee. By taking 120 lbs. of grain coffee and roasting it, its weight will be reduced to approximately 100 lbs. I grind the roasted coffee very fine, almost pulverizing it, and place it in a revolving mixture. Then I add 3.12 gallons of boiling water and ½ lb. of table salt. The mass is slowly stirred or mixed until the water is uniformly absorbed. To this mixture I add 3.2 lbs. shredded filter mass which is obtainable in sheet form and is commonly employed by breweries for filtering beer. The shredded or comminuted filter mass is thoroughly mixed with the moistened ground coffee until it is evenly distributed throughout. The mixture is transferred to a percolator having an open outlet cock at the base thereof. Water heated to the boiling point is sprayed on the surface of the coffee so that all parts of the surface receive the same amount of water. The spraying is continued at a rate at which it will be passed through or absorbed by the coffee and filter mass. No water should be permitted to accumulate on the surface of the coffee being sprayed, but enough should be employed to produce a continuous extracting effect while descending uniformly and evenly through the mass.

The even and constant slow descent of the liquid is essential to obtain the high degree of concentration desired in the finished extract. When the first of the percolate appears at the open cock, it is closed and the percolator will then contain a very heavy concentrate in the lower portion thereof. This concentrate represents a large percentage of the extractible portions of the ground coffee.

After standing 30 minutes, the cock is opened and the concentrate is drawn off until 6.25 gallons have been withdrawn. The specific gravity of this liquid extract is substantially 1.120. While the 6.25 gallons are being withdrawn, the spraying of additional liquid at the top surface of the coffee mass is renewed and continued, the rate of spraying being controlled by the rate of withdrawal of the initial 6.25 gallons.

At the completion of this operation, the initial 6.25 gallons of the solution is placed in a separate container and another 6.25 gallons is sprayed on the surface of the coffee and withdrawn from the open cock at the bottom.

The second solution is of lower specific gravity than the initial 6.25 gallons and is reduced by heat not to exceed 50° C., preferably in vacuum, to the same specific gravity, e. g. 1.120 as the original or first portion. When so reduced, the second 6.25 gallons will make approximately 1.56 gallons of extract which, when added to the original 6.25 gallons, makes a total of 7.8 gallons of finished concentrate from the original 100 lbs. of roasted coffee.

This volume of liquid extract represents practically perfect extraction of the useable portions of the coffee bean. The reduction by heat of the second solution effects certain changes in the flavor of the part so treated, the immediate result being the impartation of a stronger flavor and the combination of the two solutions produces an ideal concentrate for immediate reduction to dryness if the solution is to be converted to a dry soluble concentrate. The portion reduced by heat tends to impart a stronger coffee flavor temporarily, which is carried over to the dry soluble coffee.

The foregoing example is typical and may be varied in accordance with the quantity of coffee being treated. If the filter mass were not commingled with the finely ground coffee, the process would be stalled due to the expansion of the finely ground coffee when hot water comes in contact therewith.

If the filter mass were not employed, the coffee could not be used in an almost pulverized state and would have to be ground rather coarse to permit filtration of water through the mass.

The advantage of using a very finely ground coffee is obvious in that thereby all of the desirable properties of the coffee may be removed by a single extracting process without requiring a long soaking period, which would break down the undesirable rancid oils of the coffee that would be included in the finished product.

Although the invention has been demonstrated for use in making liquid coffee extract, it will be evident to those skilled in the art that it may have other uses in the preparation of liquid extracts from other products.

Although one embodiment of the invention has been herein illustrated and described, it will be evident to those skilled in the art that various modifications may be made in the steps of the process without departing from the principles herein set forth.

I claim:

1. The method of making liquid extracts which comprises mixing a ground or comminuted substance to be extracted with a moisture absorbing inert substance to freely permit expansion without compacting the same, soaking said mass to a desired concentration and feeding liquids uniformly through said mass to produce a liquid extract.

2. The method of making liquid coffee extract which comprises placing finely ground freshly roasted coffee in a mixer, adding water to the coffee while subjecting the same to a mixing action to moisten the coffee, adding a finely shredded filter mass by mixing-in with the coffee until thoroughly distributed throughout, placing the mixed coffee and filter mass in a percolator, spraying water on the top of the mass at a rate to produce a continuous extracting effect while descending uniformly and evenly through the coffee and filter mass until the charged water reaches the bottom of the percolator, discontinuing the spraying and permitting the coffee to soak for a sufficient length of time to concentrate the liquid with the desirable flavoring and bitter qualities of the coffee, then drawing off the concentrate from the bottom of the percolator while continuing the spraying on the surface of the coffee mass until a predetermined volume of liquid has been extracted from the coffee.

3. The method of making liquid coffee extract which comprises mixing finely ground freshly roasted coffee with a comminuted fibrous filter mass, spraying water on the surface of the mass until the liquid accumulates at the bottom of the mass, shutting off the spray to permit soaking of the mass and then continuing the spray of water while drawing off the concentrated liquid until total volume of the extract has attained a specific gravity of 1.120.

4. The method of making liquid coffee extract which comprises mixing finely ground freshly roasted coffee with a comminuted fibrous filter mass, spraying hot water on the surface of the mass until the liquid accumulates at the bottom of the mass, shutting off the spray to permit soaking of the mass and then continuing the spray of water while drawing off the concentrated liquid until total volume of the extract has attained a specific gravity of 1.120, then spraying additional water on the coffee mass and collecting the same in a separate container from the bottom of the mass until an equal volume of a weaker extract has been produced, subjecting the second solution to heat at approximately 50° C. to reduce the volume to the same specific gravity as the first solution, and adding the second solution to the first solution to constitute the finished product.

5. The step in the method of making liquid coffee extract which consists of grinding freshly roasted coffee to almost a pulverized state and mixing the same with a comminuted fibrous filter mass in preparation of subjecting the mixture to a percolating process.

6. The steps in the method of making liquid coffee extract which consist in grinding freshly roasted coffee to an almost pulverized state, adding water to the dry coffee while mixing the same to completely absorb the water, and mixing the moistened coffee with a comminuted fibrous filter mass preparatory to subjecting the mass to a continuous flow of hot water.

CLINTON W. CARTER.